US007506556B2

(12) United States Patent
Ritter et al.

(10) Patent No.: US 7,506,556 B2

(45) Date of Patent: Mar. 24, 2009

(54) DEVICE FOR OPENING AND CLOSING A VEHICLE BODY PART

(75) Inventors: Andreas Ritter, Hilgert (DE); Heiko Schilken, Lutzrath (DE); Michael Kleinmann, Melsbach (DE); Karl-Heinz Darscheid, Hillscheid (DE); Michael Hewel, Udenhausen (DE)

(73) Assignee: Stabilus GmbH, Koblenz (DE)

( * ) Notice: Subject to any disclaimer, the term of this patent is extended or adjusted under 35 U.S.C. 154(b) by 721 days.

(21) Appl. No.: 11/054,475

(22) Filed: Feb. 9, 2005

(65) Prior Publication Data

US 2005/0179280 A1 Aug. 18, 2005

(30) Foreign Application Priority Data

Feb. 12, 2004 (DE) ...................... 10 2004 007 126

(51) Int. Cl.
*F16H 27/02* (2006.01)

(52) U.S. Cl. ........................... 74/89.2; 296/56; 296/76; 74/500.5; 74/502.6

(58) Field of Classification Search .................. 74/89.2, 74/89.22, 500.5, 502.4, 502.5, 502.6; 296/56, 296/76, 106, 146.4, 146.8
See application file for complete search history.

(56) References Cited

U.S. PATENT DOCUMENTS 2,914,955 A * 12/1959 Colborne et al. .............. 74/110
4,526,057 A * 7/1985 Mochida et al. ............ 74/502.2
4,583,324 A * 4/1986 Storz et al. .................... 49/367

(Continued)

FOREIGN PATENT DOCUMENTS

DE 41 24 869 1/1993

(Continued)

OTHER PUBLICATIONS

European Search Report dated Jun. 22, 2005 issued for EP 05 00 0208.

(Continued)

*Primary Examiner*—Richard W L Ridley
*Assistant Examiner*—Matthew Johnson
(74) *Attorney, Agent, or Firm*—Cohen Pontani Lieberman & Pavane LLP

(57) ABSTRACT

Apparatus for the motorized opening and closing of a motor vehicle body part which can be pivoted with respect to a vehicle body about a hinged lid axis includes a guide cylinder having a first end and a second end which can be coupled to the body at a pivot axis which is parallel to the hinged lid axis, a piston guided displaceably in the cylinder, and a piston rod having one end attached to the piston and an opposite end which protrudes from the first end of the cylinder and can be coupled to the pivotable body part at a distance from the hinged lid axis. A drive device drives first and second Bowden cables, which extend in parallel from the second end of the cylinder, to displace the piston in the cylinder. The first Bowden cable includes a sheath which is supported on the piston and a core which is fixed to the first end of the cylinder. The second Bowden cable includes a sheath which is supported on the second end of the cylinder and a core which is fixed to the piston.

20 Claims, 5 Drawing Sheets

U.S. PATENT DOCUMENTS

| | | | | | |
|---|---|---|---|---|---|
| 4,702,117 | A | * | 10/1987 | Tsutsumi et al. | 74/89.17 |
| 4,851,742 | A | | 7/1989 | Chapman | |
| 4,900,187 | A | * | 2/1990 | Uchida et al. | 405/3 |
| 4,903,435 | A | * | 2/1990 | Bittmann et al. | 49/340 |
| 4,936,424 | A | * | 6/1990 | Costa | 188/314 |
| 5,468,042 | A | * | 11/1995 | Heinrichs et al. | 296/146.4 |
| 5,588,258 | A | * | 12/1996 | Wright et al. | 49/340 |
| 5,660,081 | A | * | 8/1997 | Sato | 74/502 |
| 5,775,764 | A | * | 7/1998 | Yamashita | 296/76 |
| 5,974,904 | A | * | 11/1999 | Dirschbacher et al. | 74/89.32 |
| 6,516,567 | B1 | * | 2/2003 | Stone et al. | 49/343 |
| 6,557,924 | B2 | * | 5/2003 | Lauderbach et al. | 296/146.4 |
| 6,600,285 | B2 | * | 7/2003 | Mintgen et al. | 318/468 |
| 6,883,275 | B2 | * | 4/2005 | Hellinga et al. | 49/345 |
| 7,021,004 | B2 | * | 4/2006 | Ritter | 49/340 |

FOREIGN PATENT DOCUMENTS

| | | | |
|---|---|---|---|
| FR | 2 717 215 | * | 9/1995 |
| FR | 2 730 714 | | 8/1996 |
| JP | 060080024 | * | 3/1994 |

OTHER PUBLICATIONS

French Preliminary Search Report dated Nov. 7, 1995 issued for FR 2 730 714.

* cited by examiner

DEVICE FOR OPENING AND CLOSING A VEHICLE BODY PART

BACKGROUND OF THE INVENTION

1. Field of the Invention

The invention relates to a device for the motorized opening and closing of a motor vehicle body part which can be pivoted about a hinged-lid axis, in particular a tailgate or a front lid, having a guide track in which a slider is displaceably guided, and an actuating rod which is fastened at its one end to the slider and at its end opposite the slider is coupled to the pivotable body part at a distance from the hinged-lid axis. The slider can be driven in a reversible and displaceable manner in the guide track by means of a first Bowden cable and a second Bowden cable actuated by a drive device.

2. Description of the Related Art

In the case of a known device of this type, the actuating rod is coupled at one end pivotably to the slider. The two guiding cables are fastened at their one end to the slider and extend in opposite directions to each other through the guide track in order to be guided to the drive device from mutually opposite ends of the guide track. The slider is noted upon in a pulling manner by a core of one of the Bowden cables, depending on the direction of movement.

This device requires a large construction space in a motor vehicle.

SUMMARY OF THE INVENTION

It is therefore the object of the invention to provide a device of the type mentioned at the beginning which has a simple construction and requires a small installation space.

This object is achieved according to the invention in that the guide track is coupled at its one end to the body, in particular in a manner such that it can be pivoted about a pivot axis parallel to the hinged-lid axis. The actuating rod together with the slider is guided in the guide track in an axially displaceable manner and at the end opposite the hinged-lid axis protrudes out of the guide track. The first Bowden cable and the second Bowden cable, at that end of the guide track which is on the hinged-lid-axis side, are guided parallel to each other away from the guide track to the drive device, the core of the first Bowden cable being connected fixedly to the guide track and the core of the second Bowden cable being connected fixedly to the slider, the sheath of the first Bowden cable being supported on the slider and the sheath of the second Bowden cable being supported on the guide track.

It goes without saying that also a plurality of actuating rods and sliders guided in guide tracks can be drivable in a displaceable manner by means of a single drive device.

Owing to the fact that both Bowden cables are guided to the drive device from the same end of the guide track, the device has a small length, so that only a small installation space is required. The device consists of just a few components of simple construction which can also be fitted with only a little outlay.

Also contributing to a small overall size is the fact that the drive device has a cable drum which can be driven in a reversible and rotatable manner and onto which the cores of the first and of the second Bowden cable can be wound and unwound in a mutually opposed manner.

The core of one Bowden cable is therefore always wound to the same extent to which the core of the other Bowden cable is unwound.

The two Bowden cables may each have a separate core.

However, the cores of the first and of the second Bowden cable preferably form a closed loop, so that they do not require any separate fastening elements on the cable drum. The cable drum can preferably be driven in a rotatable manner by means of an electric motor, it being possible for the cable drum to be driven by an electric motor which can be reversed in direction of rotation by means of pole reversal.

A construction with simple and therefore cost-effective components is achieved by the fact that the guide track is a guide cylinder and the slider is a piston which is guided displaceably in the guide cylinder and has a piston rod on one side forming the actuating rod and protruding at its one end out of the guide cylinder.

For simple guidance of the actuating rod, the guide cylinder may be closed at its one end by a first closing wall which has a guide hole which is axial with respect to the extent of the guide cylinder and through which the actuating rod is displaceably guided.

At the same time, the guide region of the guide cylinder is protected here against becoming dirty.

This is in particular the case if the guide cylinder is closed at its other end by a second closing wall.

The core of the first Bowden cable is protected if one end of the core of the first Bowden cable is connected to the first closing wall and the first Bowden cable extends axially through the guide cylinder, the core of the first Bowden cable extending displaceably through an axial opening of the piston, and one end of the sheath of the first Bowden cable being supported axially on that side of the piston which is opposite the first closing wall.

In this case, the second closing wall may have an axial guide-through hole through which the first Bowden cable is guided displaceably.

The core of the second Bowden cable is likewise protected if one end of the core of the second Bowden cable is connected to the piston and the second Bowden cable extends axially through the guide cylinder, the core of the second Bowden cable extending displaceably through a guide-through hole of the second closing wall and one end of the sheath of the second Bowden cable being supported axially on that side of the second closing wall which faces away from the piston.

To assist an extension movement, which may be the opening movement of the pivotable body part, the actuating rod may be spring-loaded in the extension direction.

For this purpose, it is possible, in a simply constructed and space-saving manner, for the guide cylinder to be enclosed with play by an helical compression spring which is supported at its one end on a supporting element of the guide cylinder and at its other end on a supporting element of that end of the actuating rod which protrudes out of the guide cylinder.

In order to detect the particular position of the pivotable body part, it is possible for the particular axial position of the actuating rod or of the slider in the guide track to be detectable by means of a position-detecting device.

In a simple design in this case, the position-detecting device is a moving coil sensor or a linear potentiometer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
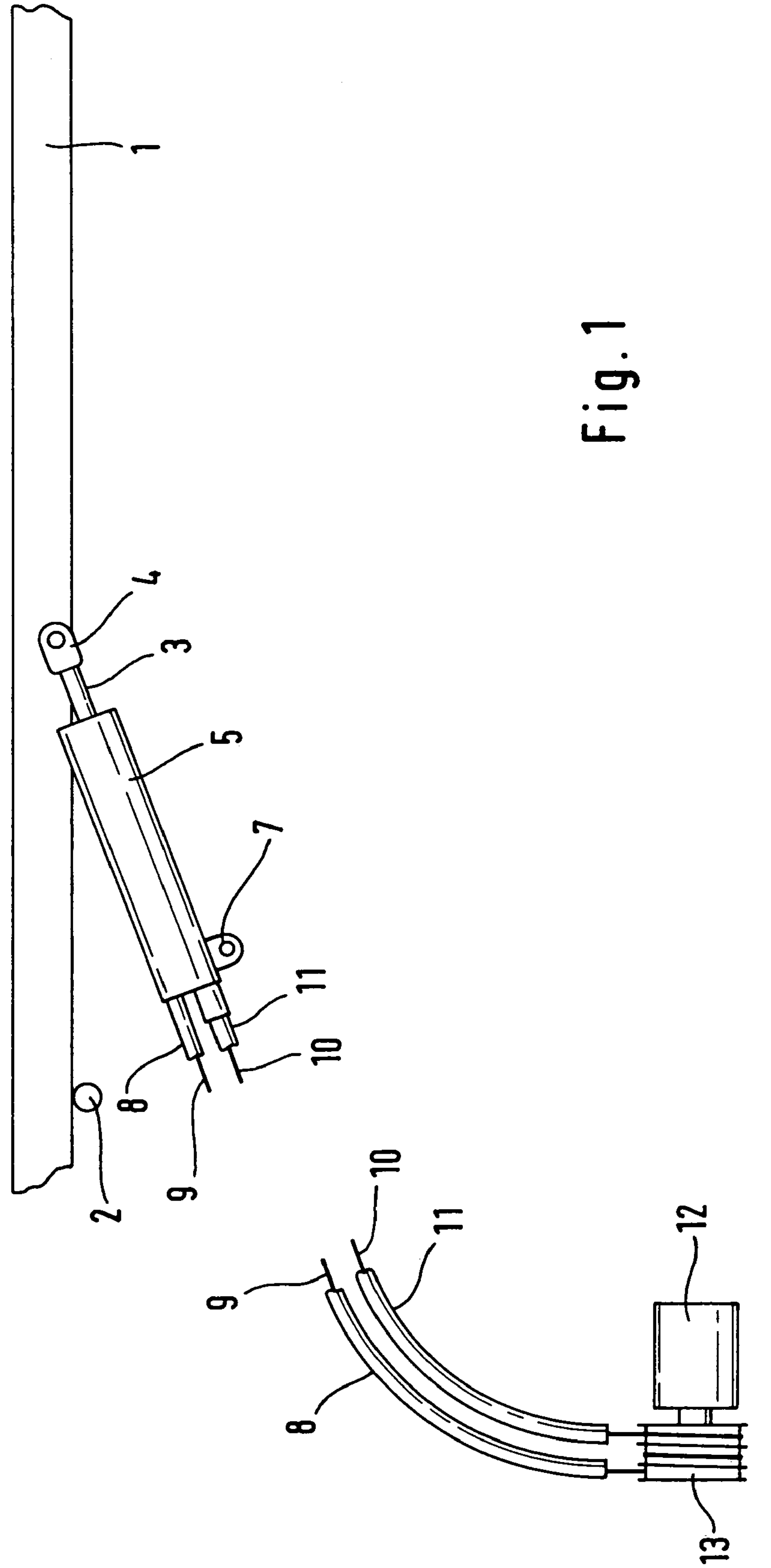
FIG. 1 is a side view of a motor vehicle tailgate with a device for the motorized opening and closing of the tailgate.

FIG. 1 illustrates a tailgate 1 which is arranged on the motor vehicle body in a manner such that it can pivot about a hinged-lid axis 2.

The free end 4 of a piston rod 3 is coupled pivotably to the tailgate 1 at a distance from the hinged-lid axis 2. The piston rod 3 leads into a guide cylinder 5 and is connected there at its other end to a piston 6, which is guided displaceably in the guide cylinder 5.

At its end opposite the free end 4 of the piston rod 3, the guide cylinder 5 is coupled to the motor vehicle body in a manner such that it can pivot about a pivot axis 7, which is parallel to the hinged-lid axis 2.

A first Bowden cable 8 having a core 9 and a second Bowden cable 11 likewise having a core 10 are led out of that end of the guide cylinder 5 which is opposite the piston rod 3. These two Bowden cables 8 and 11 lead to a drive device having a cable drum 13 which can be driven in a rotatable manner by an electric motor 12 which can be reversed in direction of rotation.

The cores 9 and 10 of the two Bowden cables 8 and 11 form a closed loop and loop around the cable drum 13. When the cable drum 13 is rotated, one core is wound by the same extent to which the other core is unwound, with the result that the two cores 9 and 10 then move in an opposed manner.

As FIGS. 2 to 5 show, that end of the guide cylinder 5 which is on the piston-rod side is closed by a first closing wall 14 and the opposite end of the guide cylinder 5 is closed by a second closing wall 15.

Figure 2:
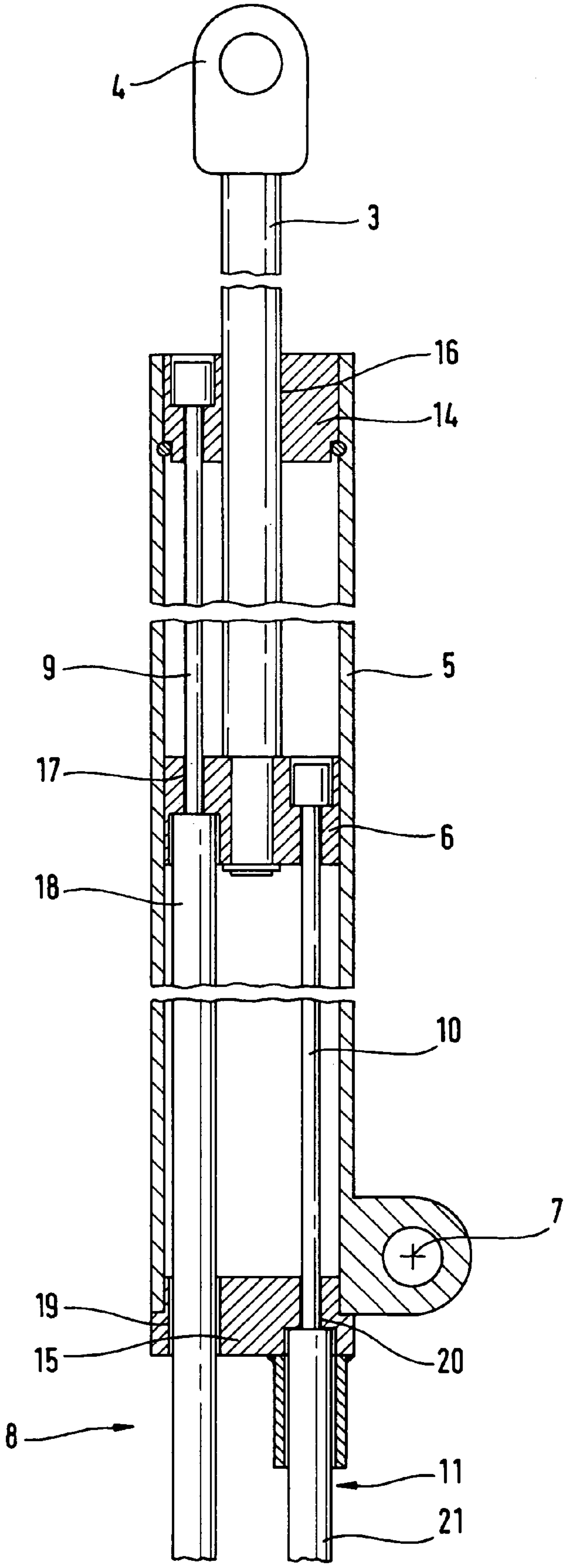
FIG. 2 is a section view of the device for the motorized opening and closing according to FIG. 1.
Figure 3:
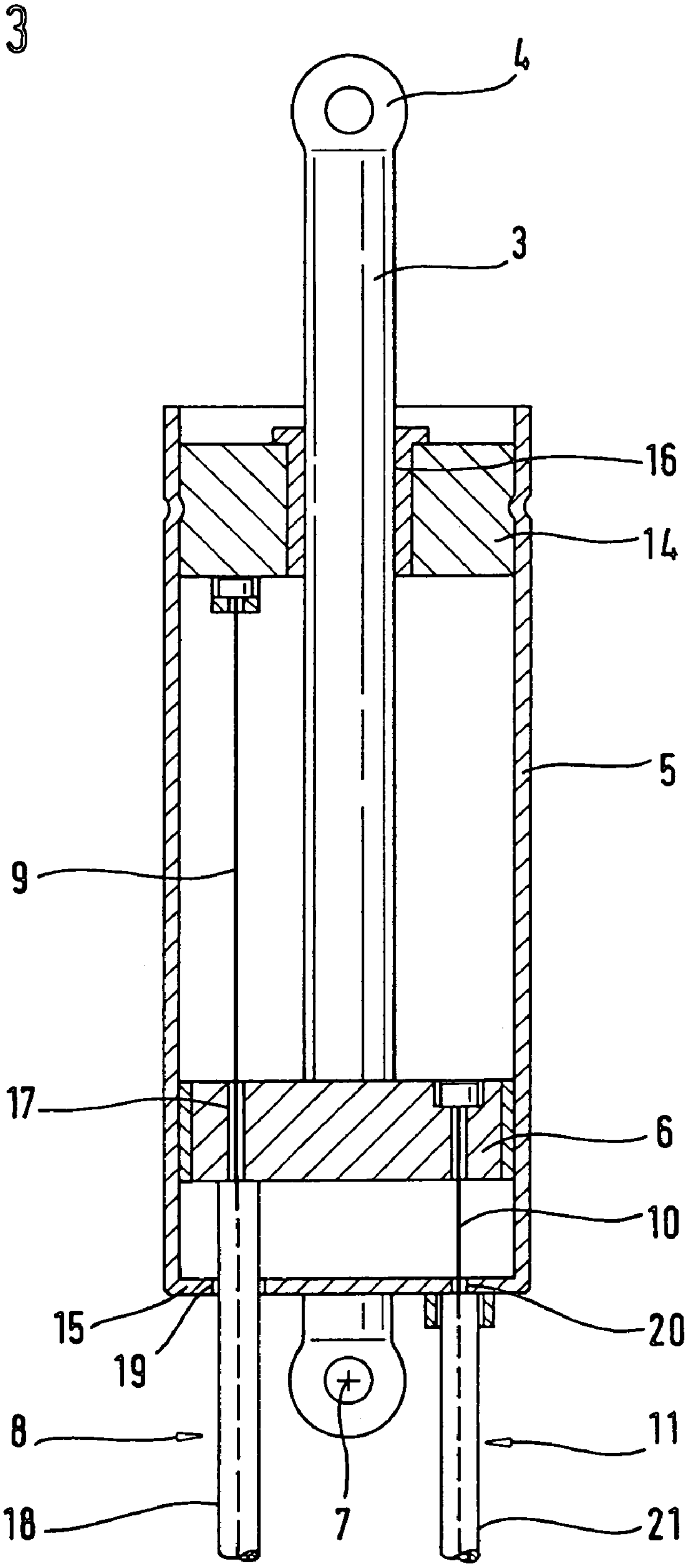
FIG. 3 is a section view of a second exemplary embodiment of a device for the motorized opening and closing of a tailgate.
Figure 4:
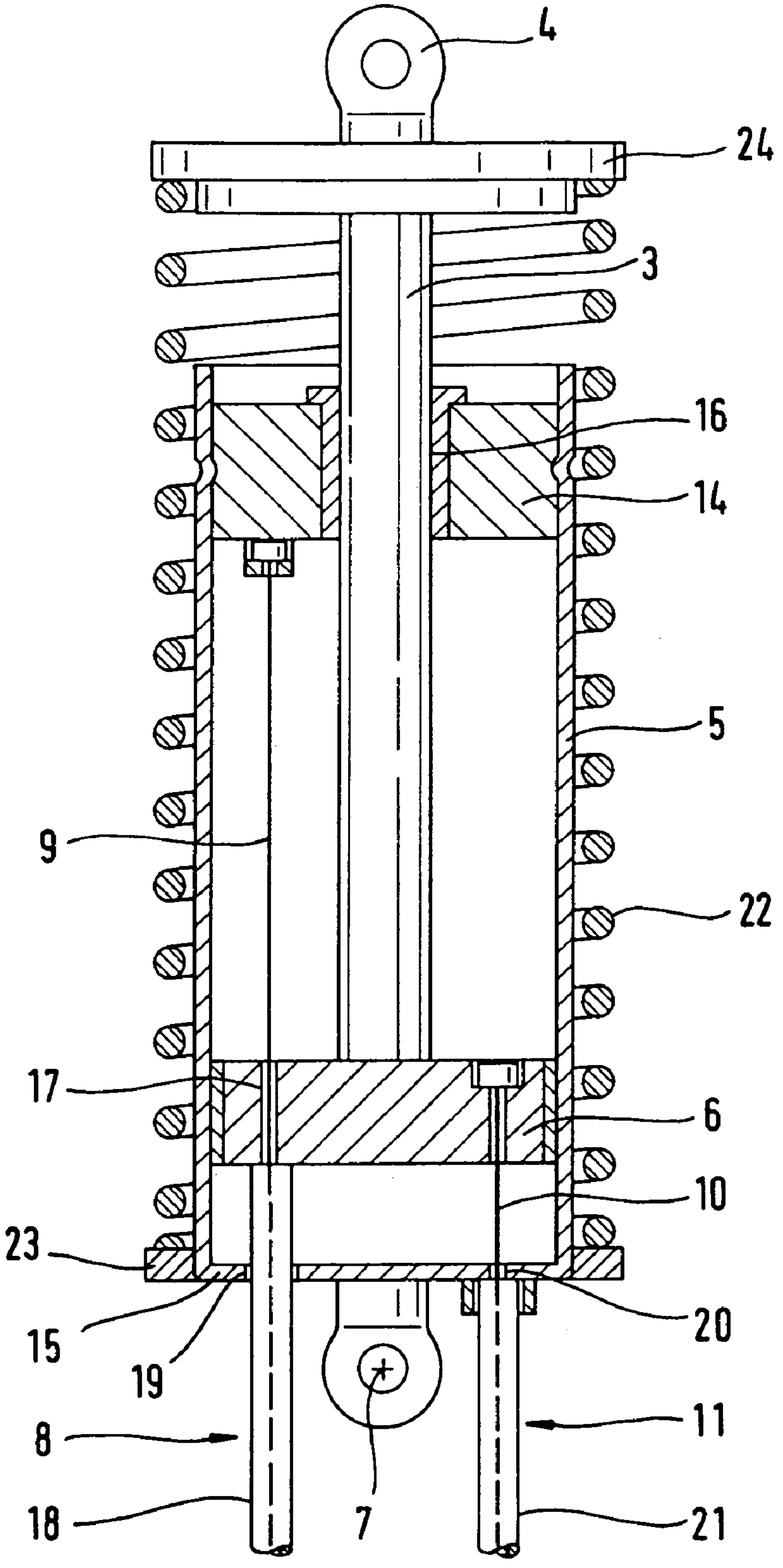
FIG. 4 is a section view of a third exemplary embodiment of a device for the motorized opening and closing of a tailgate.
Figure 5:
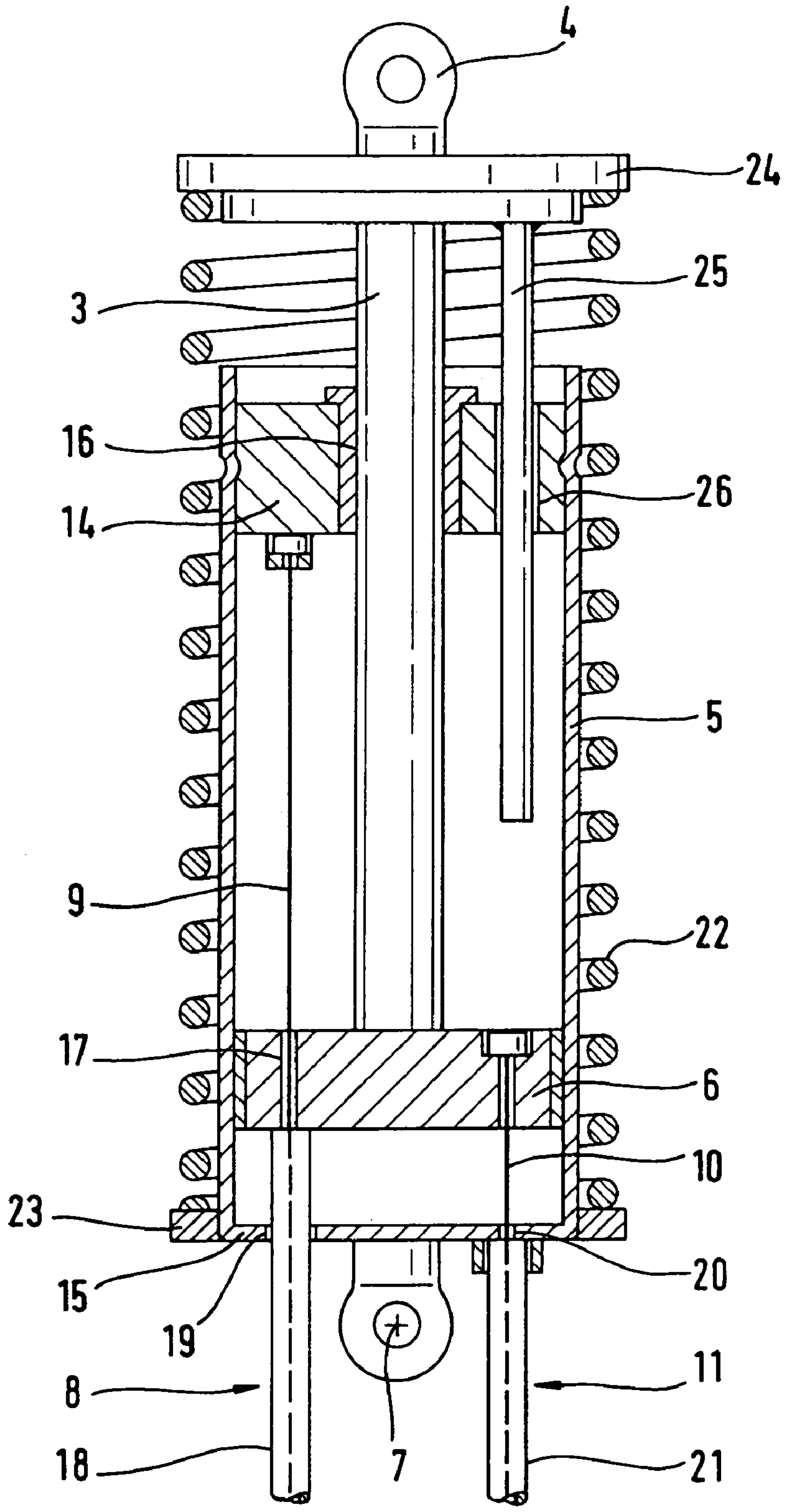
FIG. 5 is a section view of a fourth exemplary embodiment of a device for the motorized opening and closing of a tailgate.

In the exemplary embodiments of FIGS. 3 to 5, the second closing wall 15 is a base of a guide cylinder 5 of cup-like design, while, in the exemplary embodiment of FIG. 2, the second closing wall 15 is an insert inserted fixedly into the tubular guide cylinder 5.

In all of the exemplary embodiments, the first closing wall 14 is an insert.

The first closing wall 14 has an axial guide hole 16 through which the piston rod 3 is guided in a displaceable manner.

One end of the core 9 of the first Bowden cable 8 is connected fixedly to the first closing wall 14. This core 9 extends axially through the guide cylinder 5, it extending displaceably through an axial opening 17 of the piston 6. The sheath 18 of the first Bowden cable 8 is guided displaceably through an axial guide-through hole 19 in the second closing wall 15 into the guide cylinder 5 and is supported at its one end axially on the piston 6.

One end of the core 10 of the second Bowden cable 11 is connected fixedly to the piston 6. This core 10 extends axially through the guide cylinder 5 to the second closing wall 15 and is guided to the outside through a guide-through hole 20 in this second closing wall 15.

The end of the sheath 21 of the second Bowden cable 11 is supported axially on that side of the second closing wall 15 which faces away from the piston 6.

When the core 10 of the second Bowden cable 11 is tensioned, this core 11 pulls the piston 6 in the retraction direction of the piston rod 3, so that the tailgate 1 is pivoted in the closing direction. In this case, the sheath 18 of the first Bowden cable 8 is also displaced in the retraction direction while the core 9 remains stationary.

If the core 9 of the first Bowden cable 8 is subjected to a tensile stress, the sheath 18 of the first Bowden cable 8 is moved toward the first closing wall 14, so that it also acts upon the piston 6 in this direction. The latter and therefore also the piston rod 3 thus move in the extension direction and acts upon the tailgate 1 in the opening direction.

In the process, the core 10 of the second Bowden cable 11 is pulled together with the piston 6 in the direction of the first closing wall 14 into the guide cylinder 5.

In the case of the exemplary embodiments of FIGS. 4 and 5, this extension movement is assisted by a prestressed helical compression spring 22 which surrounds the guide cylinder 5 with play and is supported at its one end on a supporting element 23 of the guide cylinder 5. The other end of the helical compression spring 22 is supported on a supporting element 24 at that end of the piston rod 3 which protrudes out of the guide cylinder 5.

In the case of the exemplary embodiment of FIG. 5, a sensor rod 25 which is parallel to the piston rod 3 is also fastened to the supporting element 24 and protrudes through a sensor opening 26 in the first closing wall 14. In this case, the sensor 25 forms the movable part of a linear potentiometer, the stationary part of which is arranged in the sensor opening 26.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. Apparatus for the motorized opening and closing of a motor vehicle body part which can be pivoted with respect to a vehicle body about a hinged lid axis, said apparatus comprising:

a guide track having a first end and a second end which can be coupled to the body at a pivot axis which is parallel to the hinged lid axis;

a slider guided displaceably in said guide track;

an actuating rod having one end attached to the slider and an opposite end which protrudes from the first end of the guide track and can be coupled to the pivotable body part at a distance from the hinged lid axis;

a first Bowden cable comprising a sheath which is supported on the slider and a core which is fixed to the guide track;

a second Bowden cable comprising a sheath which is supported on the guide track and a core which is fixed to the slider; and a drive device which drives the Bowden cables to displace the slider in the guide track.

2. The apparatus of claim 1 wherein the drive device comprises a cable drum which can be driven to rotate in opposite directions, the cores of the first and second Bowden cables being wound and unwound in a mutually opposed manner as the drum rotates.

3. The apparatus of claim 1 wherein the cores of the first and second Bowden cables form a loop which is wound around the drum.

4. The apparatus of claim 2 wherein the drive device further comprises an electric motor which drives the cable drum.

5. The apparatus of claim 4 wherein the electric motor can be reversed by pole reversal in the motor.

6. The apparatus of claim 1 wherein the guide track is a guide cylinder, the slider is a piston which is guided displaceably in the guide cylinder, and the actuating rod is a piston rod connected to the piston.

7. The apparatus of claim 6 wherein the first end of the guide cylinder is closed by a first closing wall having a guide hole which is coaxial with the cylinder and receives the piston rod therethrough.

8. The apparatus of claim 6 wherein the second end of the guide cylinder is closed by a second closing wall.

9. The apparatus of claim 7 wherein the core of the first Bowden cable passes through the piston and is connected to the first closing wall, the sheath of the first Bowden cable being supported against the piston opposite from the first closing wall.

10. The apparatus of claim 8 wherein the second closing wall has a hole through which the sheath of the first Bowden cable is axially guided.

11. The apparatus of claim 10 wherein the core of the second Bowden cable passes through the second closing wall and is fixed to the piston, the sheath of the second Bowden cable being supported against the second closing wall.

12. The apparatus of claim 6 further comprising a spring which loads the actuating rod out of the first end of the guide track.

13. The apparatus of claim 12 wherein the spring is a helical compression spring surrounding the guide cylinder and having one end supported on a support element of the guide cylinder and another element supported on a support element of the piston rod.

14. The apparatus of claim 1 further comprising a position detecting device which can detect the axial position of the actuating rod with respect to the guide track.

15. The apparatus of claim 14 wherein the position-detecting device comprises one of a moving coil sensor and a linear potentiometer.

16. The apparatus of claim 1 wherein the first Bowden cable and the second Bowden cable extend in parallel from the second end of the guide track.

17. The apparatus of claim 1 wherein the slider is disposed entirely within the guide track between the first end and the second end.

18. The apparatus of claim 1 wherein the sheath of the first Bowden cable pushes the slider when the first Bowden cable is tensioned.

19. The apparatus of claim 18 wherein the core of the second Bowden cable pulls the slider when the second Bowden cable is tensioned.

20. The apparatus of claim 16 wherein the core of the first Bowden cable is fixed to the first end of the guide track and the sheath of the second Bowden cable is supported at the second end of the guide track.

* * * * *